United States Patent
Adams et al.

(10) Patent No.: US 12,491,896 B1
(45) Date of Patent: Dec. 9, 2025

(54) WHEEL STEERING CALIBRATION

(71) Applicant: Zoox, Inc., Foster City, CA (US)

(72) Inventors: Derek Adams, Pasadena, CA (US); Guillermo Duenas Arana, San Francisco, CA (US); Michael Carsten Bosse, Templeton, CA (US)

(73) Assignee: Zoox, Inc., Foster City, CA (US)

( * ) Notice: Subject to any disclaimer, the term of this patent is extended or adjusted under 35 U.S.C. 154(b) by 207 days.

(21) Appl. No.: 17/990,418

(22) Filed: Nov. 18, 2022

(51) Int. Cl.
*B60W 50/06* (2006.01)
*B60W 50/02* (2012.01)

(52) U.S. Cl.
CPC ........ *B60W 50/06* (2013.01); *B60W 50/0205* (2013.01); *B60W 50/0225* (2013.01); *B60W 2510/20* (2013.01); *B60W 2520/14* (2013.01)

(58) Field of Classification Search
CPC ............. B60W 50/06; B60W 50/0205; B60W 50/0225; B60W 2510/20; B60W 2520/14
USPC .......................................................... 701/36
See application file for complete search history.

(56) References Cited

U.S. PATENT DOCUMENTS

| | | | | |
|---|---|---|---|---|
| 11,613,380 B1 * | 3/2023 | Foland | ................. | G08G 5/0013 701/3 |
| 2002/0183906 A1 * | 12/2002 | Ikeda | ................. | G01C 21/3844 348/148 |
| 2003/0088350 A1 * | 5/2003 | Lin | ........................ | B62D 7/159 701/41 |
| 2007/0067085 A1 * | 3/2007 | Lu | ........................ | B60W 40/114 340/440 |
| 2008/0262677 A1 * | 10/2008 | Komori | ............... | B60W 40/103 701/41 |
| 2022/0041180 A1 * | 2/2022 | Choi | ...................... | G06N 3/045 |

* cited by examiner

*Primary Examiner* — Abby J Flynn
*Assistant Examiner* — Sean Patrick Reidy
(74) *Attorney, Agent, or Firm* — EIP US LLP

(57) ABSTRACT

Techniques are described herein for determining correction coefficients for steering wheel angles according to a steering component of a vehicle. The techniques comprise redefining the problem of determining the correction into terms of turn angle and crab angle of the vehicle, which both directly depends on leading and trailing steering angles, taking advantage of techniques for estimation of the turn angle based on non-steering parameters/measurements. By redefining the problem, at least one of a scale or bias term for the correction may be calculated to be used in a linear model for estimating a crab angle of the vehicle.

20 Claims, 6 Drawing Sheets

WHEEL STEERING CALIBRATION

BACKGROUND

A vehicle may include various sensors, which may be utilized for many different purposes. For example, sensors may be used to detect information about a surrounding environment as well as to monitor vehicle operations. In some instances, sensor data may be consumed by downstream operations. For example, steering data may be used for dead reckoning or other localization processes. As such, accuracy and reliability of the sensor data is important to allow the vehicle to safely and reliably navigate through an environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1A:
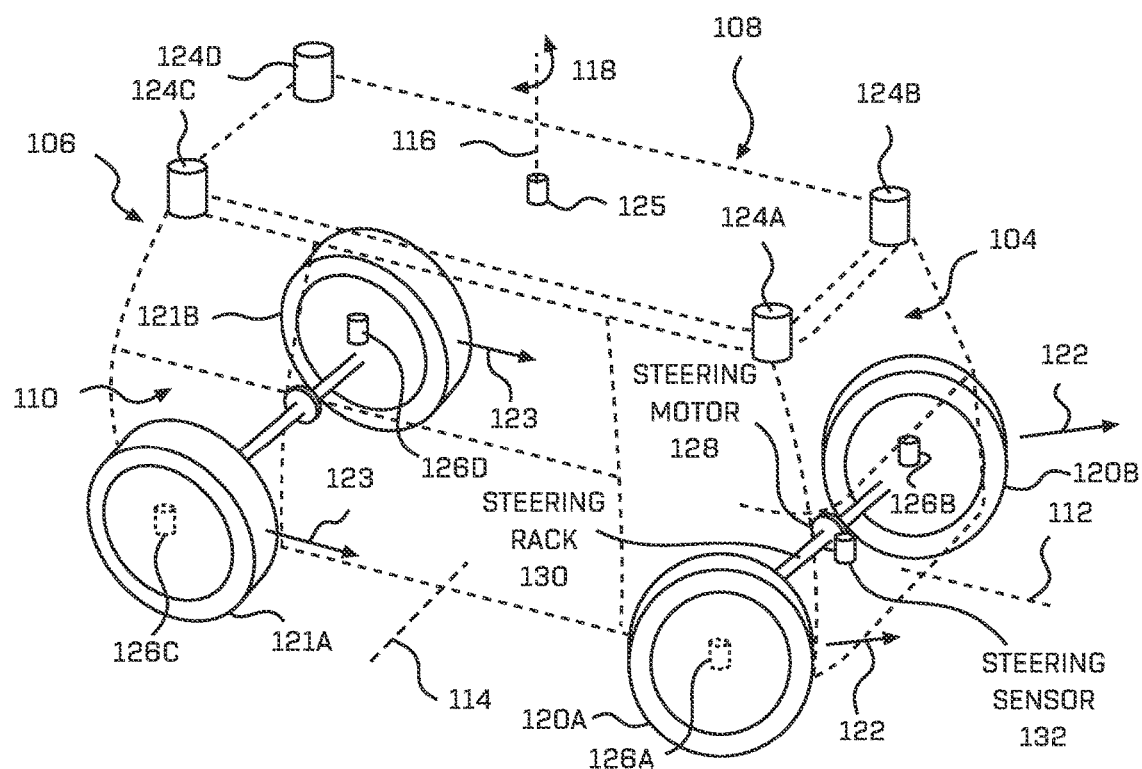
FIG. 1A illustrates a perspective view of an example vehicle with a leading pair of wheels turned at an angle.

This disclosure describes procedures, as well as methods, systems and computer-readable media for correction of, and thus improved estimates of, both leading and trailing steering angle measurements of a vehicle. By redefining the problem of determining the correction into terms of turn angle and crab angle (also referred to as a slip angle) of the vehicle, which both directly depends on the leading and trailing steering angles, scale and bias terms for the correction may be calculated using a linear model. Using this model, an error per second of dead reckoning or other localization processes of the vehicle during a turn of the vehicle may be reduced with between 6-12 times. Moreover, when determining the scale and bias terms while the vehicle is moving, fault events such as a wheel puncture event, a wheel alignment error event or a steering component wear event may be detected based on that scale and bias terms are changing compared to earlier calculations of the same terms.

As used herein, a "bicycle model" takes a 4-wheel model and combines the leading and trailing wheels respectively to form a two-wheeled model. A bicycle model is thus a mathematical model in which a leading pair of wheels of the vehicle is combined into one leading wheel, and in which a trailing pair of wheels of the vehicle is combined into one trailing wheel. This is a simplified model that does very well at capturing vehicle motion.

A vehicle may include various steering components used to affect or control an angle of a vehicle wheel. For example, a vehicle may include a steering motor that generates a rotational output, which is transferred to a wheel and/or to linear travel of a steering rack. A steering sensor may measure the rotation of the steering motor, and the rotation may be used to determine (e.g., from a correlation between rotation and linear rack travel) steering rack travel (or other steering data associated with a command angle of the wheel). In other examples, steering rack travel may be directly measured or may be derived from other sensor data associated with the steering system or the suspension assembly. The steering data (e.g., motor rotation data, rack travel distance, etc.) may in turn be used to estimate an angle of a wheel. Typically, a pair of wheels, such as leading (north) pair of wheels or trailing (south) pair of wheels, are controlled by the steering motor to be turned to a same angle, which is a reason as to why the bicycle model performs well under normal driving conditions. As used in this disclosure, the "angle of a wheel" or "wheel angle" is an angle between the orientation of the wheel (e.g., a direction in which the wheel is pointed) and the longitudinal orientation or axis of the vehicle.

As used in this disclosure, a "commanded wheel angle" is a wheel angle generated by one or more vehicle components and selected for executed by the vehicle. For example, a trajectory planner may select a trajectory (e.g., turn maneuver) to be executed by the vehicle, and the trajectory may include a wheel angle (e.g., the commanded wheel angle) at which a wheel should be turned (e.g., by using steering components) in order to execute the trajectory. In other examples, a steering wheel may be rotated to a degree that correlates with a wheel angle (e.g., the commanded wheel angle), which can be attempted using the steering motor, rack, and/or other steering components. Based on these examples, the commanded wheel angle may be generated or provided by the trajectory planner and/or by the steering components. For example, the commanded wheel angle may be an angle that is provided by (or retrieved from) a vehicle-trajectory planner, steering components (e.g., steering sensor, steering motor, and/or steering rack), or any combination thereof. Commanded wheel angles in turn lead to a turn angle and a crab angle of the vehicle as will further described below. Throughout the disclosure the turn angle and the crab angle resulting from the commanded wheel angle(s) are referred to as "commanded turn angle" and "commanded crab angle" for case of description and to clearly separate these angles from estimated angles.

However, the actual wheel angles, (leading to an actual turn angle and actual crab angle, referred to herein as "estimated") may differ from the commanded wheel angles (commanded turn angle, commanded crab angle) due to e.g., inaccuracies arising from the steering-component(s) or other mechanical reasons such as motion of suspension, twists from the wheels when in contact with the surface/road, etc. There may also exist physical limitations of control inherent to systems. Consequently, dead reckoning or other localization processes may experience errors due to faulty assumption of the wheel angles.

Such inaccuracies may be modelled using scaling and bias terms. By redefining the problem of correcting the wheel angle measurements into terms of turn angle and crab angle of the vehicle, taking advantage of the possibility to use non-steering variables to estimate a turn angle, the scaling and bias terms may be determined using a linear model and sensor data from e.g., a driving log (which includes historical data about previous driving).

In examples of the present disclosure, one or more of a scaling or bias coefficient may be determined and be used in a linear model to estimate a crab angle.

As used in this disclosure, a "crab angle" is an angle in which a vehicle moves. A crab angle of zero means that the vehicle moves in a direction equal to a center line of the vehicle in a longitudinal direction, i.e., along a front-to-back direction. The center line is 90 degrees in relation to a rear axle of the vehicle. Any value other than 0 will affect the relationship between the front and rear wheels and cause "crabbing" which means that the vehicle will have a lateral velocity as well as a longitudinal velocity.

In examples, a commanded crab angle is determined based at least in part on commanded wheel angles. The commanded crab angle is thus the crab angle as calculated based commanded wheel angle(s) according to a steering component of the vehicle. A commanded wheel angle such as the commanded wheel angle of a leading pair of wheels (herein referred to as the "first" commanded wheel angle) may be determined based at least in part on at least one of a steering rack travel and a steering motor rotation.

In examples, to determine the one or more of scaling or bias coefficients, an estimated lateral acceleration, an estimated turn angle, the commanded crab angle and a lateral velocity of the vehicle may be used.

According to embodiments, an estimated turn angle of a vehicle may be determined based at least in part on a yaw rate, a linear velocity and a distance between a rear axle and a front axle of the vehicle. Advantageously, an estimation of the turn angle may be done based on non-steering parameters/measurements and thus less susceptible to inaccuracies from steering components. A yaw rate (e.g., from an inertial measurement unit, gyroscope, etc.), a linear speed or velocity of vehicle (e.g., from an encoder) and vehicle dimensions can be used to estimate the turn angle of the vehicle.

Given the comparably accurate way of estimating a turn angle, it is advantageous to parameterize the inaccuracies from steering components in terms of bias and/or scaling coefficients to be used in a linear model for estimating a crab angle of the vehicle. In example, one or more of a scaling or bias coefficient may be determined based at least in part on an estimated lateral acceleration, the estimated turn angle, the commanded crab angle, and a lateral velocity of the vehicle.

In examples, the lateral acceleration of the vehicle may be estimated using based at least in part of the yaw rate and the linear velocity of the vehicle. In examples, the estimated lateral acceleration comprises a centripetal acceleration component and a gravitational acceleration component. The gravitational acceleration component may be calculated based on a roll angle of the vehicle.

In example, the lateral velocity of the vehicle may be calculated from sensor data. For example, sensor data from one or more of a GPS, LIDAR, RADAR, Sonar and camera may be used in conjunction with map data to determine a lateral velocity of the vehicle. However, using such sensor data and map data to determine a lateral velocity may be computationally resource intense and the calculations may not be performed at a frequency needed when a vehicle is moving in a relatively high speed. An example of the frequency at which these calculations can be performed is 5 Hz. In examples, such calculations also result in a delayed lateral velocity. Consequently, the vehicle may experience lateral drift due to inaccuracies of the steering components which is not detected until a next point in time when the lateral velocity is calculated as described above. However, using historical data, calculated lateral velocities may be used in conjunction with other sensor data captured at a corresponding time to determine the scaling and bias coefficients as detailed herein.

In examples, one or more of the scaling and bias coefficients to be used in a linear model for estimating a crab angle of the vehicle may be determined based at least in part on the estimated lateral acceleration, the estimated turn angle, the commanded crab angle, and the lateral velocity of the vehicle. For example, the scaling and bias coefficients may be determined by performing an optimization over a data set comprising the estimated lateral acceleration, the estimated turn angle, the commanded crab angle and the lateral velocity, as will be described in further detail below. The data set may comprise sensor data from a plurality of points in time. In examples, data set corresponds to the estimated lateral acceleration, the estimated turn angle, the commanded crab angle and the lateral velocity of the vehicle during a drive having a duration of 5 to 15 minutes. The optimization may be a least square optimization being solved using Cholesky decomposition or QR decomposition, though any other optimization method is contemplated.

In examples, an operation of the vehicle may be controlled based at least in part on the one or more of the scaling or bias coefficient. For example, an estimated wheel angle of a wheel of the vehicle may be determined based at least in part on the scaling and bias coefficients. This estimation may be more accurate compared to the commanded wheel angle, such that a trajectory of the vehicle may be more accurately controlled. In examples, a relative position of the vehicle compared to a previous known position of the vehicle may be determined. The relative position of the vehicle may be determined at least in part by estimating a wheel angle of the leading pair of wheels (and the trailing pair of wheels if applicable) based at least in part on scaling and bias coefficients. Put differently, the estimated wheel angle may be used by downstream processes to determine vehicle position or other vehicle states (e.g., velocity), which may be used for localization or other map-related operations.

In examples, a difference between one of the scaling and bias coefficients, and a corresponding historical scaling or bias coefficient may be determined. Consequently, changing coefficients may be detected, for example while the vehicle is in use (driving). The sensor data required to identify changing coefficients may be continuously stored in one or more driving logs which may be used to recalibrate the steering measurement. Such recalibration may take place at regular intervals or being triggered by a remote operator or user of the vehicle or being triggered based on any other suitable event. Changing coefficients may be indicative of events relating to the vehicle, in particular in case the difference between the current coefficient (scaling and/or bias) and a corresponding historical coefficient meets or exceeds a threshold value. Examples of such events are a wheel puncture event, a wheel alignment error event or a steering component wear event. Based at least in parts of the event, the vehicle may be controlled. In examples, an indication of the event may be provided to the user of the vehicle, or a remote operator of the vehicle. The event may be logged. The event may further result in the vehicle slowing down or the vehicle being stopped. The event may be used to assess condition of the steering components.

The vehicle may implement 2-wheel steering where only the angle of the leading pair of wheels are controllable while the trailing wheels are fixed. In other examples, the vehicle implements a 4-wheel steering where also the angle of the trailing pair of wheels can be controlled.

In some examples, the wheel angle of the trailing pair of wheels may not be independently controlled from the leading pair of wheels, but instead the wheel angle of the trailing pair of wheels of the vehicle equals the first commanded wheel angle (the leading pair of wheels) with a reversed sign. The commanded turn angle and the commanded crab angle may in this case be determined based at least in part on the first commanded wheel angle and the wheel angle of the trailing pair of wheels of the vehicle.

In some examples, the trailing pair of wheels may be independently controlled from the leading pair of wheels. The angle of the independently controlled trailing pair of wheels is referred to as a second commanded wheel angle, which is indicative of a wheel angle of a trailing pair of wheels according to a steering component of the vehicle, for example based at least in part on at least one of: a steering rack travel; and a steering motor rotation.

The second commanded wheel angle may be determined based at least in part on the sensor data. A linear velocity of the leading pair of wheels and a linear velocity of the trailing pair of wheels may also be determined based at least in part on the sensor data. The linear velocity of the two pairs of wheels may be sensed by a respective encoder placed at each wheel (or at one wheel of the two in a pair) or be calculated based on a common linear velocity of the vehicle and yaw rate of the vehicle. The turn angle of the vehicle may in this case be determined based at least in part on the yaw rate, the linear velocity of the leading pair of wheels, the linear velocity of the trailing pair of wheels, and a distance between a rear axle and a front axle of the vehicle.

The techniques described herein can be implemented in a number of ways to determine one or more of a scaling or bias coefficient to be used in a linear model for estimating a crab angle of a vehicle. Examples are provided below with reference to FIGS. 1-6. Examples are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles. Furthermore, the techniques described herein can be used with real data (e.g., captured using sensor(s)), simulated data (e.g., generated by a simulator), or any combination of the two. Reducing the error per second of dead reckoning or other localization processes of the vehicle may improve safety of operating a fully or partially autonomous vehicle.

Figure 1B:
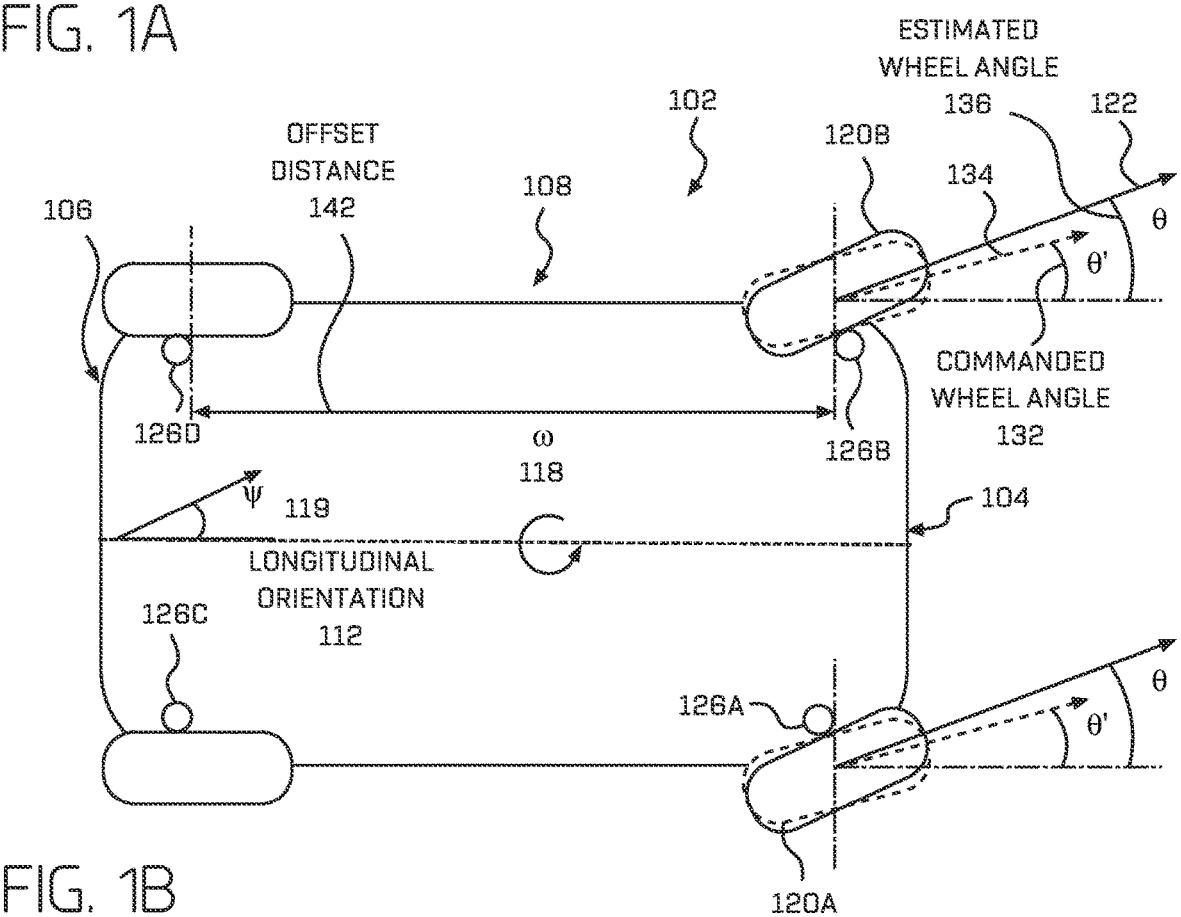
FIG. 1B illustrates a plan view of the vehicle of FIG. 1A showing an estimated wheel angle and a commanded wheel angle for a leading pair of wheels, as described herein.

FIG. 1A and FIG. 1B illustrates different views of an example vehicle 102 with components for determining one or more of a scaling or bias coefficient to be used in a linear model for estimating a crab angle of a vehicle, which in turn can be used to estimate angles of wheels of the vehicle 102.

FIG. 1A depicts a perspective view of the vehicle 102, which is ghosted in broken lines to help illustrate internally positioned components; and FIG. 1B presents a plan view of the vehicle 102. Among other things, the vehicle 102 includes a leading end 104, a trailing end 106, a left side 108, and a right side 110. In addition, for reference in this disclosure, the vehicle 102 includes a longitudinal axis 112 extending along a front-to-back orientation (e.g., longitudinal orientation) and a lateral axis 114 extending along a side-to-side orientation (e.g., lateral orientation) and substantially perpendicular to the longitudinal axis 112. Furthermore, a vertical axis 116 may extend top-to-bottom and perpendicular to the longitudinal axis 112 and to the lateral axis 114. FIG. 1A also depicts a yaw action 118, which indicates the vehicle 102 may rotate relative to the vertical axis 116, such as when the vehicle 102 executes a turn. For example, the vehicle 102 includes four wheels 120a-b, 121a-b, in a leading pair of wheels 120a-b and a trailing pair of wheels 121a-b. Each wheel is oriented in a direction indicated by a respective directional arrow 122, 123. In FIGS. 1A and 1B, the front wheels 120a and 120b are depicted rotated at a estimated angle (θ) towards the left in a direction indicated by a respective directional arrow 122. The placement of the yaw action 118 in FIG. 1A illustrates an example, and the vehicle 102 a yaw action, yaw event, or yaw rotation may occur at various locations or positions of the vehicle.

In one example, the vehicle 102 is a bidirectional vehicle having a first drive module positioned in the front end 104 and a second drive module positioned in the rear end 106. As used herein, a bidirectional vehicle is one that is configured to switch between traveling in a first direction of the vehicle and a second, opposite, direction of the vehicle. In other words, there is no fixed "front" or "rear" of the vehicle 102. Rather, whichever longitudinal end of the vehicle 102 is leading at the time becomes the "front" and the trailing longitudinal end becomes the "rear." In other examples, the techniques described herein may be applied to vehicles other than bidirectional vehicles. Also, whether or not the vehicle is bidirectional, the first drive and second drive modules may be different from one another. For example, one drive module may have a subset of the features of the other drive module. In one such example, the first drive module may include a first, comprehensive set of vehicle systems (e.g., drive motor, battery, steering system, braking system, suspension system, HVAC, sensors, lights, body panels, facia, etc.) while the second drive module includes a limited subset of vehicle systems (e.g., suspension system, braking system, sensors, lights, and facia). In various instances, the wheels 120a-b positioned in the leading end 104 are steerable, and the wheels 121a-b positioned in the trailing end 106 are also steerable, such that the vehicle 102 includes four-wheel steering (e.g., including each pair of wheels 120a-b, 121a-b having the respective steering components). In other examples, the wheels 121a-b positioned in the trailing end 106 are not independently controlled compared to the wheels 120a-b positioned in the leading end 104 to the extent that the wheel angle 123 of the trailing pair of wheels 121a-b of the vehicle equals the wheel angle 122 of the leading pair of wheels 120a-b with a reversed sign. In yet other examples, the wheels 121a-b positioned in the trailing end 106 are fixed.

In addition, the vehicle 102 may include various sensors for detecting one or more different conditions. For example, the vehicle 102 may include sensors 124a-124d, each of which may include a perception sensor for capturing data of an environment around the vehicle 102 (e.g., LIDAR, camera, time-of-flight, sonar, radar, etc.). These sensors 124a-124d may be used for various operations, such as object detection, route planning, localization, etc. In at least one example, the vehicle 102 may also include a yaw rate sensor 125, such as an inertial measurement unit (IMU), gyroscope, or other sensor for measuring a yaw rate 118 of the vehicle 102. The position of the yaw rate sensor 125 is an example, and the yaw rate sensor 125 may include various other positions or locations of the vehicle 102. In a further example, the vehicle 102 may include one or more sensors 126a-126d (e.g., encoders) for measuring a wheel speed of a respective wheel (e.g., determining a linear speed of the vehicle 102 at a wheel). These are just some examples of sensors, and the vehicle may include other sensors, such as those described with respect to the system 600 in conjunction with FIG. 6. In addition, the placement of the sensors relative to the vehicle 102 in FIG. 1A is an example, and in other examples, the sensors (e.g., 124a-124d and 125) may be arranged at other positions on the vehicle 102.

In additional examples, the vehicle 102 may include various steering components, such as a steering motor 128 and a steering rack 130 that operate to affect a commanded angle of one or more of the wheels 120a-120d (e.g., autonomously commanded and/or manually commanded) such as for the leading pair of wheels 120a, 120b in the example of FIG. 1a. For example, the steering motor 128 may generate a rotational output based on steering input (e.g., direction and amount) from a manually operated steering wheel (not shown), from a computing device (e.g., planning 626 in FIG. 6), or from a combination thereof. The rotational output may be transferred to the steering rack 130 to create linear steering rack travel in one direction or another. The steering rack 130 may interface with each wheel at a knuckle of the suspension assembly or some other coupling that transfers the linear rack travel to the wheel to cause the wheel to pivot or rotate about an axis. In examples, the vehicle 102 may include one or more steering sensors 132 for determining steering data associated with the commanded angle Θ' of each of the pair of wheels 120a-b, 121a-b. For example, the steering sensor 132 may determine an amount of steering-motor rotation, an amount of steering rack travel, or other data, which may be related to the commanded angle Θ' of each wheel pair, such that it will be oriented in a direction indicated by a respective directional arrow 134. That is, in some instances, a commanded angle Θ' may be selected for execution, and the commanded angle may correlate with an amount of steering motor rotation and/or rack travel. As such, in some examples, a commanded angle Θ' may be determined based on given steering data by referencing the correlation. In FIG. 1A, a steering assembly is depicted in the leading end 104 and trailing end 106 of the vehicle. In other aspects, only one end of the vehicle may include a steering assembly while the other end is fixed.

In some instances, steering components may be used to impart an angle on one or more wheels of the vehicle 102, such as when the vehicle is executing a turn. For example, in FIG. 1A the front wheels 120a and 120b are rotated to the left. In addition, the steering components may impart a wheel angle based on a commanded wheel angle Θ' from another component (e.g., trajectory planner, manual steering wheel, etc.) or the steering sensor data may be used to determine a commanded angle based on a correlation. However, in some instances, such as due to component noise or inaccuracies at the steering components, the commanded angle (e.g., from the other component or based on the steering data correlation) Θ' may not accurately reflect the actual angle θ of each wheel. For example, referring to FIG. 1B, the actual orientations of the front wheels 120a and 120b are illustrated with the directional arrow 122; however, the orientations reflected by the commanded angles 132 (also indicated in FIG. 1B by Θ') are indicated by the broken-line command arrows 134 and are inconsistent with the actual orientation arrows 122. As such, examples of the present disclosure are directed to determining scaling and bias terms for correcting a commanded wheel angle (e.g., 134/Θ') to a more accurate estimation of the wheel angle (e.g., 136/Θ) of a wheel (e.g., 120a and 120b). This may be achieved by redefining the problem of determining the correction into terms of turn angle (ϕ) and crab angle (ψ) of the vehicle, which both directly depends on the leading and trailing steering angles such that:

$$\phi = \frac{\alpha - \beta}{2} \text{ and } \psi = \frac{\alpha + \beta}{2} \tag{Eq. 1}$$

where
α: commanded wheel angle of the leading pair of wheels, and
β: commanded wheel angle of the trailing pair of wheels (zero in FIG. 1a-b)

Equation 1 defines the vehicle according to a bicycle model. The bicycle model is a mathematical model in which a leading pair of wheels of the vehicle is combined into one leading wheel, and in which a trailing pair of wheels of the vehicle is combined into one trailing wheel. The bicycle model is a classic model that does very well at capturing vehicle motion in normal driving conditions. Moreover, it simplifies the mathematics required to determine scaling and bias terms for correcting a commanded wheel angle. Instead of working with α and β, ϕ and ψ will be used from now on. This is advantageous because it exists a more accurate method to estimate turn angle than using the steering angles, as will be described below in conjunction with FIGS. 2a-c.

The turn angle thus can be accurately determined (estimated) using non-steering variables such as yaw rate 118, the linear velocity (e.g., as determined by one or more encoders 126a-d) and a distance 142 between a rear axle and a front axle of the vehicle. Examples of how to determine the turn angle using non-steering parameters is described in U.S. application Ser. No. 17/364,161 titled "ESTIMATING ANGLE OF A VEHICLE WHEEL BASED ON NON-STEERING VARIABLES" and filed Jun. 30, 2021 which is incorporated herein by reference in its entirety for all purposes. The same application also describes examples of how to estimate wheel angles without using a bicycle model.

However, the crab angle 119 (further described below in conjunction with FIG. 3), which is indicative of the angle of motion ψ of the vehicle as compared to a center line of the vehicle in a longitudinal direction 112 (i.e., along a front-to-back direction) is not easily determined using sensor measurements directly. Instead, a linear model to estimate a crab angle may be determined and one or more scaling or bias coefficients may be calculated by performing an optimization over a data set with historical data.

Such data set may be achieved by storing (logging, recording) readouts or measurements from the sensors 124a-124d, 125, 126a-d, etc., for example in one or more driving logs. The sensor data may be associated by a time stamp in the logs, such that it is possible to determine sensor data from different sensors that were measured at a same or similar point in time.

The vehicle 102 may include a vehicle computing device (not shown) and may be part of a vehicle system (not shown) that includes one or more remote computing devices. Such on board or remote computing device may use sensor data as discussed above to for example localization or other map related operations. For example, data from a spinning LIDAR sensor or radar sensor (possibly combined with GPS data, vision data from a camera, etc.) may be matched to map data to determine vehicle position or other vehicle states (e.g., lateral velocity). However, such calculations are computationally complex and may not be performed at a frequency required at high speeds of the vehicle or during turns of the vehicle to keep track of the position of the vehicle at a necessary scale with a low error rate at all times. Instead, it is possible to use the IMU, wheel angles and the linear speed of the vehicle to integrate a position from the last known position (e.g., as determined based on the LIDAR sensor data matched to map data). This requires an accurate measurement of the wheel angles, which is hard to get from only the steering components due to e.g., inaccuracies arising from the steering-component(s). However, corrections of the measurements may be parameterized by redefining the problem of determining the correction into terms of turn angle ($\phi$) and crab angle ($\psi$) of the vehicle according to Equation 1 above.

Figure 2A:
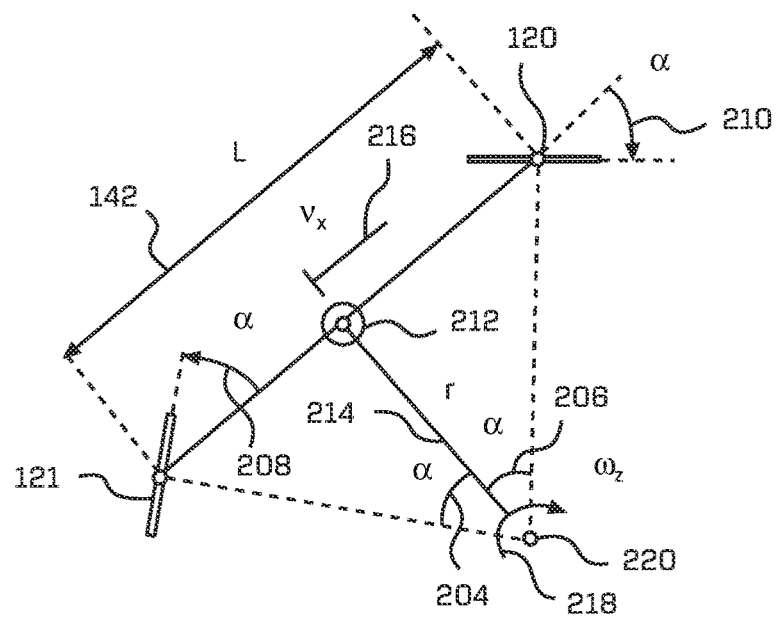
FIG. 2A schematically illustrates an estimation of a turn angle using a bicycle model of a 4-wheel vehicle in a first scenario.
Figure 2B:
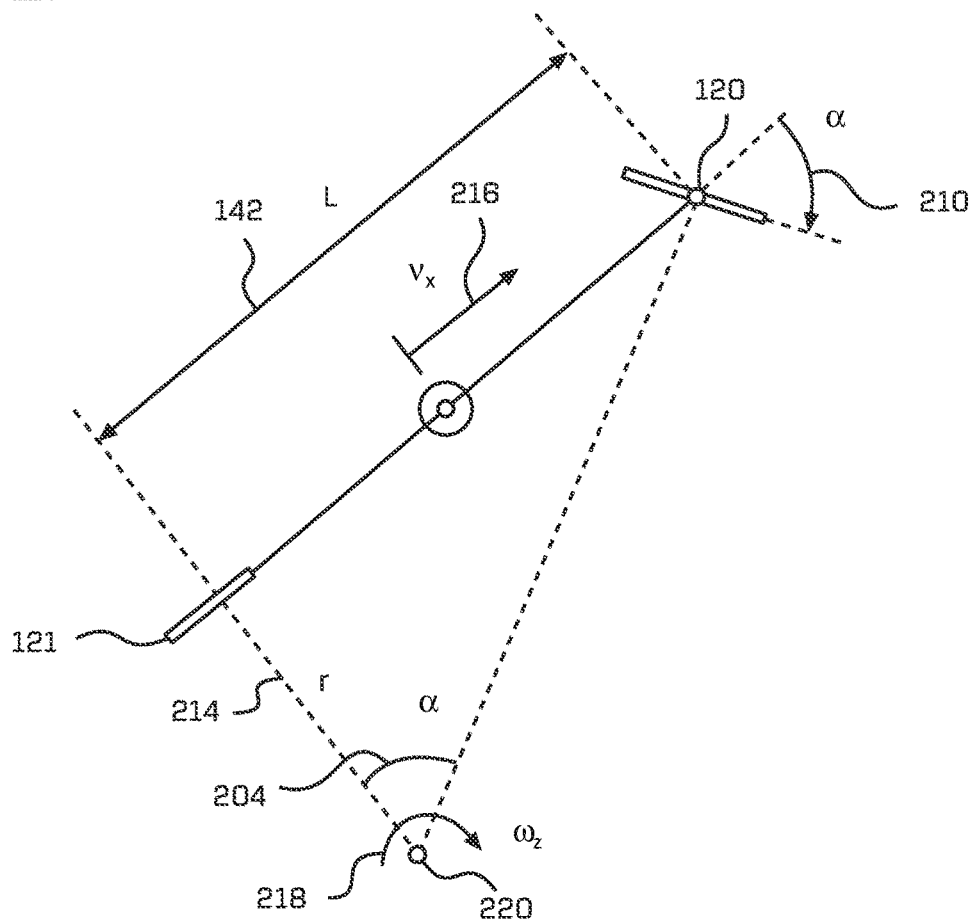
FIG. 2B schematically illustrates an estimation of a turn angle using a bicycle model of a 4-wheel vehicle in a second scenario.
Figure 2C:
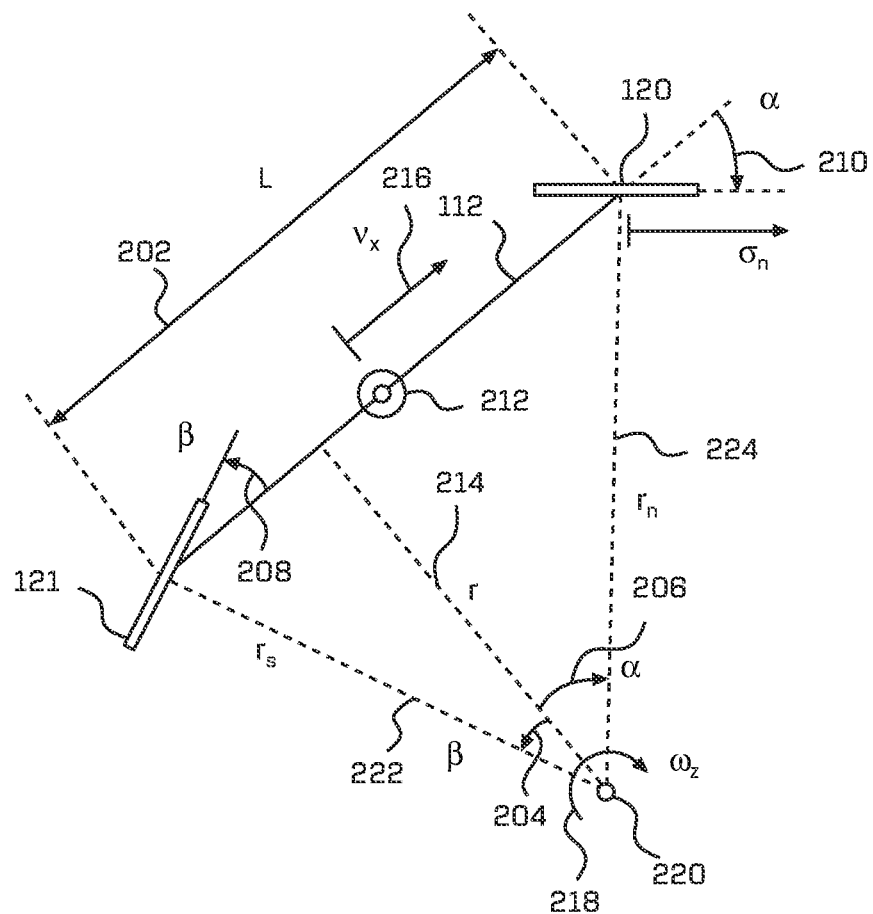
FIG. 2C schematically illustrates an estimation of a turn angle using a bicycle model of a 4-wheel vehicle in a third scenario.

FIGS. 2a-c describes different scenarios of estimation of a turn angle ($\phi$) using a bicycle model of a 4-wheel vehicle (such as the vehicle 102 in FIGS. 1a-b).

In some examples, the wheel angle of the trailing pair of wheels of the vehicle equals the wheel angle of the leading pair of wheels with a reversed sign. This means that ($\alpha=-\beta$) which means that:

$$\phi = \frac{\alpha - \beta}{2} = \alpha \quad \text{(Eq. 2)}$$

Such a scenario is described in FIG. 2A. The estimated turn angle may in this case be determined from the yaw rate, the linear velocity and a distance between a rear axle and a front axle of the vehicle. In FIG. 2A, the wheel base 142, which may be obtained from the vehicle config or otherwise be known, is the distance between the leading wheel 120 and the trailing wheel 121. The linear velocity 216 is the velocity at base link 212 of the vehicle. Base link 212 in this context is defined as halfway between the front and rear wheel axels of the vehicle. The velocity 216 at base link 212 is known and may be calculated based on one or more measured linear velocities at the wheels (as measured by one or more encoders, such as encoders 126a-d in FIG. 1a-b), for example as an average from such measurement(s). It should be noted that velocity can be transferred between points on a rigid body substantially without any errors. The angular velocity 218 is also know from measurements from the IMO. The radius 214 of the curvature is not known but may be calculated by:

$$v_x = \omega_z \cdot r \rightarrow r = \frac{v_x}{\omega_z} \quad \text{Eq. 3}$$

Which gives from FIG. 2A:

$$\tan(\alpha) = \frac{L/2}{r} \quad \text{Eq. 4}$$

where
L is the wheel base 142.
$v_x$ is the baselink velocity 216 in x-direction.
$\omega_z$ is the angular velocity 218 in z-direction.
r is the radius 214 of curvature.

Consequently, this gives $$\phi = \alpha = \arctan\left(\frac{L/2}{v_x/\omega_z}\right) \quad \text{Eq. 5}$$

In some examples, the vehicle implements 2-wheel steering meaning that $\beta=0$. This scenario is described in FIG. 2b, in which $$\phi = \frac{\alpha - \beta}{2} = \frac{\alpha}{2} \quad \text{Eq. 6}$$

The same references as in FIG. 2a is valid but note that the linear velocity 216 this time may be calculated at the trailing wheel 121 and used as the base link linear velocity 216. From the figure:

$$\tan(\alpha) = \frac{L}{r} = \frac{L}{v_x/\omega_z} \rightarrow \alpha = \arctan\left(\frac{L}{v_x/\omega_z}\right) \quad \text{Eq. 7}$$

and thus $$\phi = \frac{\arctan\left(\frac{L}{v_x/\omega_z}\right)}{2} \quad \text{Eq. 8}$$

In some examples, the wheel angle of the trailing pair of wheels may be controlled independently of the wheel angle pf the leading pair of wheels which means that ($\alpha \neq \beta$). This scenario is described in FIG. 2c in which "N" denotes the leading (or north) wheel 120 and "S" denotes the trailing (or south wheel 121).

First, the velocity vector $\vec{v}_N$ at the leading wheel 120 and velocity vector $\vec{v}_S$ at the trailing wheel 121 needs to be determined.

$$\vec{v}_N = \vec{v}_{BL} + \vec{\omega} \wedge \vec{l}_{BL\text{-}N} \quad \text{(Eq. 9)}$$

$$\vec{v}_S = \vec{v}_{BL} + \vec{\omega} \wedge \vec{l}_{BL\text{-}S} \quad \text{(Eq. 10)}$$

To determine $\vec{l}_{BL\text{-}N}$ and $\vec{l}_{BL\text{-}S}$, a projection of $r_N$ 224 and $r_S$ 222 onto the baselink x-axis 112 (i.e., corresponding to the center line 112 of the vehicle in a longitudinal direction) is checked. This will in turn determine a point of intersection between the radius 214 of curvature and the x-axis of the base link axis 112. $\vec{l}_{BL\text{-}N}$ and $\vec{l}_{BL\text{-}S}$, denotes the lever arm, i.e. the vector between the intersection point and the leading and trailing wheel 120, 121 respectively. $\vec{v}_{BL}$ is the velocity vector 216 at this intersection point. The velocity vector used may be the velocity vector determined for a previous point in time, for example using data from a spinning LIDAR sensor or radar sensor (possibly combined with GPS data, vision data from a camera, etc.) as described above. $\vec{\omega}$ denotes the full rotational vector (at least in the x- and y-plane) and may be measured by the gyroscope/IMU accelerometer. Equation 9 and 10 gives 3D vector quantities, but only 2D norms in x-y plane is needed:

$$v_N = \sqrt{v_{NX}^2 + v_{NY}^2} \cdot \text{sign}(v_x) \quad \text{(Eq. 11)}$$

$$v_S = \sqrt{v_{SX}^2 + v_{SY}^2} \cdot \text{sign}(v_x) \quad \text{(Eq. 12)}$$

Now $r_N$ 224 and $r_S$ 222 can be obtained by computing these same velocities only using the angular velocity and Equation 3:

$$v_N = \omega_z \cdot r_N \quad \text{(Eq. 13)}$$

$$v_S = \omega_z \cdot r_S \quad \text{(Eq. 14)}$$

Computing both expressions give:

$$r_N = \frac{1}{\omega_z} \cdot \sqrt{v_{NX}^2 + v_{NY}^2} \cdot \text{sign}(v_x) \quad \text{(Eq. 15)}$$

$$r_S = \frac{1}{\omega_Z} \cdot \sqrt{v_{SX}^2 + v_{SY}^2} \cdot \text{sign}(v_x) \quad \text{(Eq. 16)}$$

Finally, $\alpha$ and $\beta$ can be obtained as:

$$\cos(\alpha) = \frac{r}{r_N} = \frac{v_x}{\omega_z} \cdot \frac{\omega_z}{\sqrt{v_{NX}^2 + v_{NY}^2}} \cdot \text{sign}(v_x) = \frac{|v_x|}{\sqrt{v_{NX}^2 + v_{NY}^2}} \quad \text{(Eq. 17)}$$

$$\Rightarrow \alpha = \arccos\left(\frac{|v_x|}{\sqrt{v_{NX}^2 + v_{NY}^2}}\right) \quad \text{(Eq. 18)}$$

Similar calculations are made to determine $\beta$. Note that both $\alpha$ and $(-\alpha)$ solves this equation (and similarly $\beta$ and $(-\beta)$). To determine the sign of $\alpha$ and $\beta$, three different scenarios have to be considered. Scenario 1 is when $\alpha$ and $\beta$ have opposite signs. This is the most common case for a 4-wheel steering vehicle. FIG. 2C shows such a scenario. In scenario 2, $\alpha$ and $\beta$ have the same sign and $|\alpha|>|\beta|$. In scenario 3, $\alpha$ and $\beta$ have the same sign and $|\alpha|<|\beta|$. To choose between the scenarios 1-3 described below, a projection of $r_N$ 224 and $r_S$ 222 onto the baselink x-axis 112 (i.e., corresponding to the center line 112 of the vehicle in a longitudinal direction) is checked. This will in turn determine a point of intersection between the radius 214 of curvature and the x-axis of the base link 212. The projection (lever arm as discussed above) of $r_N$ 224 is referred to as $l_N$ and the projection of $r_S$ 222 is referred to as $l_S$:

$$l_N = |r_N \cdot \sin(|\alpha|)| \quad \text{(Eq. 19)}$$

$$l_S = |r_S \cdot \sin(|\beta|)| \quad \text{(Eq. 20)}$$

These values can be compared to each other and against the wheel base (L) 202 to select among the scenarios:

$$\left.\begin{array}{c} l_N < L \\ l_S < L \end{array}\right] \Rightarrow \text{scenario } 1\left(\begin{array}{c} \text{sign}(\alpha) = \text{sign}(r) \\ \text{sign}(\beta) = -\text{sign}(r) \end{array}\right) \quad \text{(Eq. 21)}$$

$$\left.\begin{array}{c} l_N > L \\ l_N > l_S \end{array}\right] \Rightarrow \text{scenario } 2\left(\begin{array}{c} \text{sign}(\alpha) = \text{sign}(r) \\ \text{sign}(\beta) = \text{sign}(r) \end{array}\right) \quad \text{(Eq. 22)}$$

$$\left.\begin{array}{c} l_S > L \\ l_S > l_N \end{array}\right] \Rightarrow \text{scenario } 3\left(\begin{array}{c} \text{sign}(\alpha) = -\text{sign}(r) \\ \text{sign}(\beta) = -\text{sign}(r) \end{array}\right) \quad \text{(Eq. 23)}$$

Equation 17 and 18 gives:

$$|\alpha| = \arccos\left(\frac{v_x}{\sqrt{v_{NX}^2 + v_{NY}^2}}\right) \quad \text{(Eq. 24)}$$

$$|\beta| = \arcsin\left(\frac{v_x}{\sqrt{v_{SX}^2 + v_{SY}^2}}\right) \quad \text{(Eq. 25)}$$

Finally, adding the appropriate signs to $\alpha$ and $\beta$, the turn angle is estimated as $$\phi = \frac{1}{2}(\alpha - \beta).$$

It has been shown examples of how to estimate the turn angle ($\phi$) without using the steering rack measurement. The next sections show examples of how to estimate the crab angle using a linear model that can be fitted to historical data, e.g., from driving logs.

Different to the turn angle, the crab angle, $$\psi = \frac{\alpha + \beta}{2}$$

as defined in Equation 1, cannot be estimated using quantities such as forward velocity and angular velocity.

Figure 3:
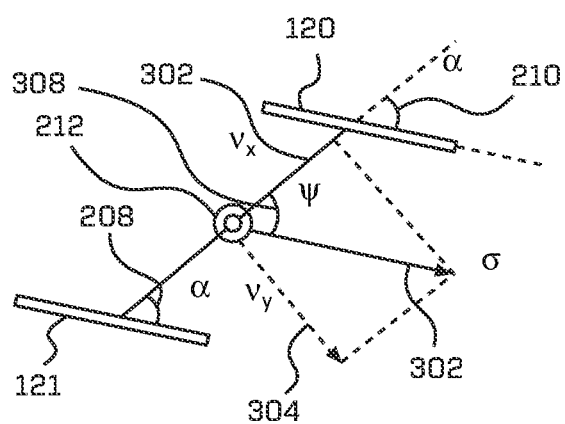
FIG. 3 schematically illustrates how crab angle influence a lateral velocity of a 4-wheel vehicle using a bicycle model.

FIG. 3 shows an extreme case where the vehicle (such as the vehicle 102 in FIGS. 1a-b) is purely crabbing, which means that the wheel angle 210 of the leading wheel 120 and the wheel angle 208 of both the trailing wheel 121 are equal ($\alpha$) i.e., $\psi=\alpha$. Crab angle mainly influences lateral velocity ($v_y$) 304 and its ratio to the velocity along the x-axis ($v_x$) 302 such that:

$$\tan(\psi) = \frac{v_y}{v_x} \quad \text{(Eq. 26)}$$

The lateral velocity ($v_y$) can as discussed above be estimated at a lower frequency using for example by matching data from a spinning LIDAR sensor or Radar sensor (possibly combined with GPS data, vision data from a camera, etc.) to map data. Such values can be logged and used to fit a linear model of the crab angle as:

$$v_y^2 = v_x^2 \cdot \tan(\psi_e) + v \quad \text{(Eq. 27)}$$

where:
  $v_y^2$: the logged value of lateral velocity
  $v_x^2$: a measured velocity velocity along the x-axis
  $\psi_e$: predicted crab from linear model
  $v \sim \mathcal{N}(0, \Sigma)$: noise By assuming that $\Sigma$ is known (i.e., that the velocity noise is Gaussian with zero-mean and having a known variance/covariance), the focus will be on $\psi_e$, i.e., the estimated crab angle.

A linear model with 4 coefficients is defined to estimate the crab angle. The linear model is based at least in part on the estimated lateral acceleration, the estimated turn angle and the commanded crab angle, and comprising scaling and bias coefficients. The 4 coefficients are:

A bias term that corrects any driveline miscalibration.
A scale factor on the steering rack measured crab angle.
A scale factor on the estimated turn angle.
A spring factor on lateral acceleration.
The linear model is determined as:

$$\psi_e = \psi_c + b + s_\psi \cdot \psi_c + s_t \cdot t_e + l \cdot a_y \quad \text{(Eq. 28)}$$

where:
$\psi_e$ is the estimated crab angle
$\psi_c$ is the commanded crab angle
b is the bias term on the commanded crab angle
$s_\psi$ is the scale factor on the commanded crab angle
$s_t$ is the scale factor on the estimated turn angle
$t_e$ is the estimated turn angle
l is the spring factor on lateral acceleration
$a_y$ is the lateral acceleration The lateral acceleration can either be based on measurements from the IMU accelerometer or be based at least in part on the yaw rate and the linear velocity. In examples, the lateral acceleration is computed from centripetal and gravitational acceleration since forces acting on the suspension and tires from gravity and turning may change the effective crab angle.

$$a_y = \underbrace{a_y^{centrip}}_{\text{centripetal accel.}} + \underbrace{g_y}_{\text{gravitational accel.}} \quad \text{(Eq. 29)}$$

Such that $$a_y = \omega v + g \sin(\theta_{roll}) \quad \text{(Eq. 30)}$$

where:
g is the gravitational constant
$\theta_{roll}$ is the rotation of a vehicle about the longitudinal axis, which can be determined from map information based on position of the vehicle and/or from the accelerometer.

In some examples, the gravitational acceleration is omitted from the calculation of the lateral acceleration. Omitting the gravitational accelerations still provides a good estimation of the lateral acceleration, in particular on roads that are substantially flat.

The commanded crab angle is determined, based at least in part on the first commanded wheel angle (reference 134 in FIG. 1). In some examples e.g., as shown in FIG. 2C, a second commanded wheel angle is defined. The second commanded wheel angle is indicative of a wheel angle of a trailing pair of wheels 121 of the vehicle according to a steering component of the vehicle. In this example, the commanded crab angle is determined, based at least in part on the first commanded wheel angle and the second commanded wheel angle.

In some examples, e.g., as shown in FIG. 2B, the wheel angle of the trailing pair of wheels 121 of the vehicle equals the first commanded wheel angle with a reversed sign. In this case, the commanded crab angle is determined based at least in part on the first commanded wheel angle and the wheel angle of the trailing pair of wheels of the vehicle.

The scaling and bias coefficients may thus be determined by performing an optimization over a data set comprising the estimated lateral acceleration, the estimated turn angle, the commanded crab angle and the lateral velocity.

Fitting the four coefficients to data can be done using a least square optimization. With the small angle simplification ($\psi \approx \tan(\psi)$) and stacking all measurements together:

$$\theta_e = \arg\min \|v_y - H \cdot \theta\|_{\Sigma^{-1}}^2 \quad \text{(Eq. 31)}$$

where $$v_y^T = [v_{y_1}^g, \ldots, v_{y_N}^g] \quad \text{(Eq. 32)}$$

$$\theta^T = [b, (1+s_\psi), s_t, l] \quad \text{(Eq. 33)}$$

$$H = \text{diag}(v_{x_1}, \ldots, v_{x_N}) \cdot \begin{bmatrix} 1 & \psi_{m_1} & t_{e_1} & a_{y_1} \\ 1 & \psi_{m_2} & t_{e_2} & a_{y_2} \\ & & \vdots & \\ 1 & \psi_{m_N} & t_{e_N} & a_{y_N} \end{bmatrix} \quad \text{(Eq. 34)}$$

and N is the number of measurements.
The normal equation is:

$$H^T \cdot \Sigma^{-1} \cdot H \cdot \theta = H^T \cdot \Sigma^{-1} \cdot V_y \quad \text{(Eq. 35)}$$

which can be efficiently solved for θ using for example QR or Cholesky decompositions. It should be noted that this is just an example of how to perform the least square optimization.

The scaling and bias coefficients have thus been determined. Determining the coefficients may be done while the vehicle is not used, for example based on historical data from a previous drive of the vehicle. In some examples, determining of the coefficients is performed each time the vehicle has been used, or at regular intervals such as once per day, week or month. Determining the coefficients may be done while the vehicle is used, for example at regular intervals during a drive based on sensor data from a previous time period during the drive.

Figure 4:
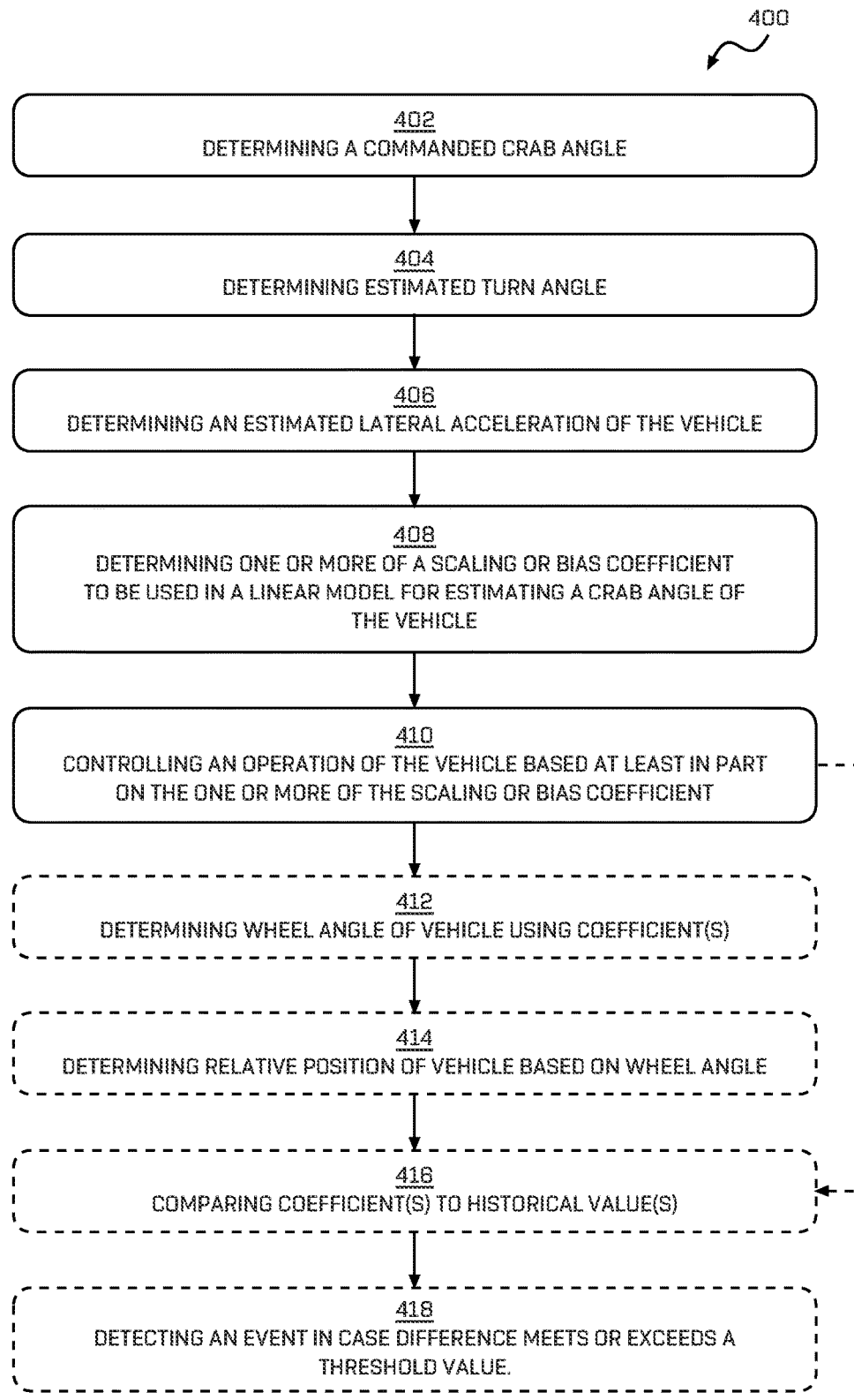
FIG. 4 depicts a flow chart of a process of determining scaling and bias coefficients for estimating a crab angle of a vehicle and using the coefficients when controlling an operation of the vehicle

FIG. 4 depicts a flow chart of a process 400 of determining scaling and bias coefficients for estimating a crab angle of a vehicle and using the coefficients when controlling an operation of the vehicle. The process 400 comprises determining 402, based at least in part of sensor data, a commanded crab angle indicative of an angle of motion of a vehicle with a wheel turned at a first commanded steering angle for steering a vehicle (e.g., according to a steering component of the vehicle). The process 400 further comprises determining 404 an estimated turn angle indicative of an estimation of a degree of rotation of the vehicle. The process 400 further comprises determining 406 an estimated lateral acceleration of the vehicle.

The process 400 further comprises determining 408 one or more of a scaling or bias coefficient to be used in a linear model for estimating a crab angle of the vehicle. This is done based at least in part on the estimated lateral acceleration, the estimated turn angle, the commanded crab angle and a lateral velocity of the vehicle. The process 400 further comprises controlling 410 an operation of the vehicle based at least in part on the one or more of the scaling or bias coefficient.

The process may comprise determining 412, based at least in part on the scaling and bias coefficients, an estimated wheel angle of a wheel of the vehicle. This step is further explained in conjunction with FIG. 5 below.

The process may comprise determining 414 a relative position of the vehicle based on the estimated wheel angle in step 412. For example, dead reckoning may be based on the last known position, the vehicle's velocity vector (speed and direction), and how long that velocity has been maintained. Consequently, a position of the vehicle may be updated on a map based at least in part on the estimated wheel angle. As such, the vehicle position may be more accurate since any lateral drift of the vehicle may be better monitored and compensated for.

In examples, a comparison 416 is done between the one of the scaling and bias coefficients determined in step 408, and a corresponding historical scaling or bias coefficient, e.g., as stored in a driving log or in any other suitable storage. A difference may be determined and, based at least in part on that the difference meeting or exceeding a threshold value, an event may be detected 418. The event may be used for controlling the operation of the vehicle. For example, the event may comprise one of: a wheel puncture event, a wheel alignment error event or a steering component wear event. The event may be indicated to a user of the vehicle or a remote operator of the vehicle. The event may cause the vehicle to slow down or stop or indicate that the vehicle needs to undergo service. The event may comprise compensating for e.g., the wheel alignment error in steering control to get the vehicle safely to the intended destination.

The person skilled in the art realizes that the disclosure by no means is limited to the order of the steps in the exemplary embodiment of the process 400 described above. On the contrary, variations are possible within the scope of the appended claims. For example, the step of determining 402 a commanded crab angle and determining 404 determining an estimated turn angle may be done in a different order or in parallel.

Figure 5:
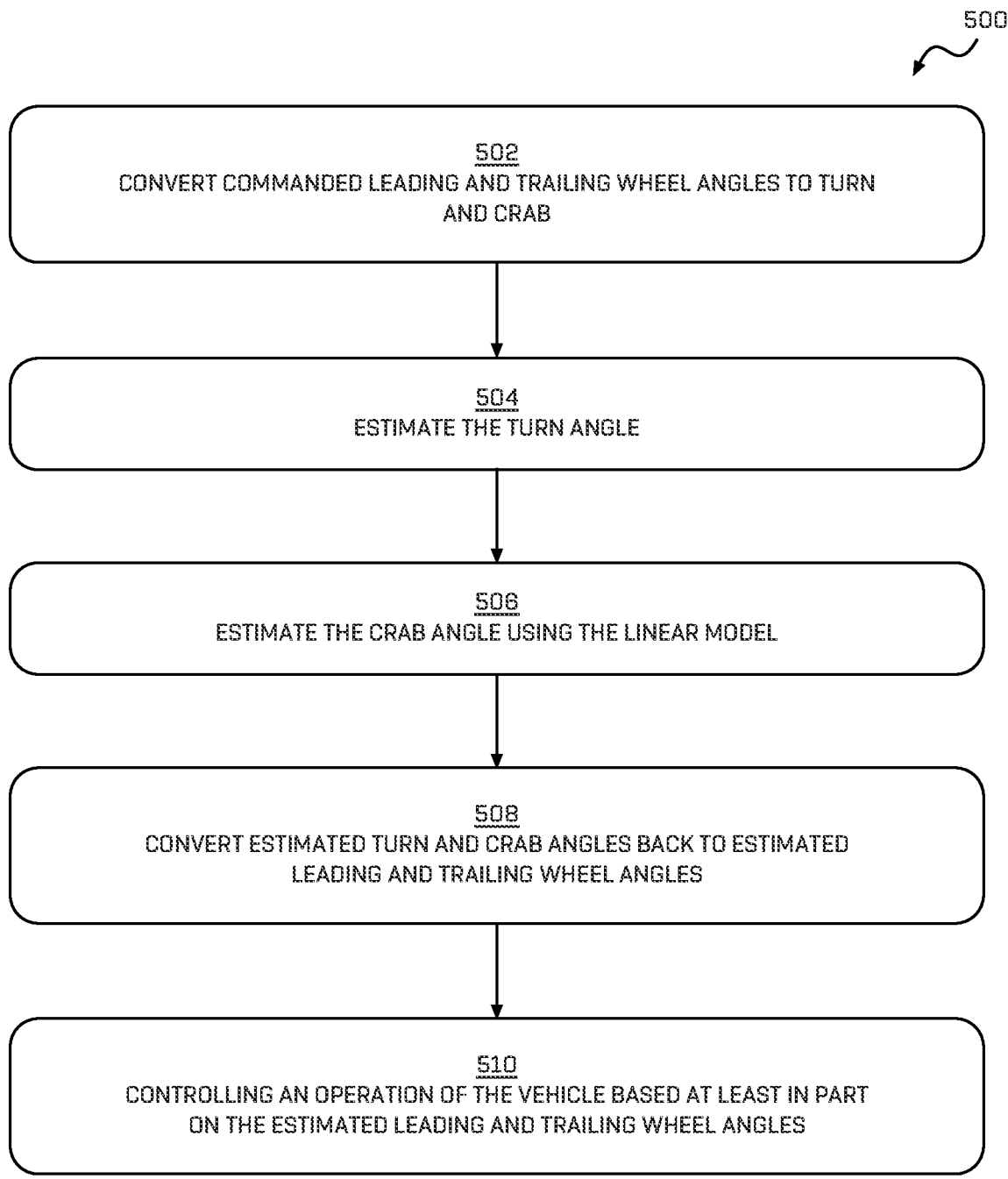
FIG. 5 depicts a flow chart of a process of determining estimated angles of a leading and a trailing pair of wheels of a vehicle while driving.

Once the correction parameters (the scaling and bias coefficients) of the linear model in Equation 28 have been determined (fitted to historical data as defined in Equation 31-34), the model may be used to estimate leading and trailing wheel angles. FIG. 5 depicts a flow chart of a process 500 of determining estimated angles of a leading and a trailing pair of wheels of a vehicle while driving.

The process comprises converting 502 commanded leading wheel angle ($\alpha_c$), and in examples the commanded trailing wheel angle ($\beta_c$), to turn and crab according to Equation 1:

$$\phi_c = \frac{\alpha_c - \beta_c}{2} \text{ and } \psi_c = \frac{\alpha_c + \beta_c}{2}.$$

The process 500 further comprises estimating 504 the turn angle ($\phi_e$) based at least in part on the yaw rate ($\omega$), the linear velocity (v) and a distance between a rear axle and a front axle of the vehicle (L) using one of the three previously presented methods as described in conjunction with FIGS. 2*a-c*. $\phi_e = f(v, \omega, L)$ The process further comprises estimating 506 the crab angle ($\psi_e$) using the linear model from Equation 28: $\psi_e = \psi_c + b + \psi_c \cdot s_\psi + \phi_e \cdot s_\phi + 1 \cdot a_y$, where [b, $s_\psi$, $s_\phi$, 1] are the model parameters learnt from data and $a_y$ is the y-axis (lateral) acceleration. The lateral acceleration can be computed as described in Equation 29-30.

When the estimated turn angle ($\phi_e$) and the estimated crab angle ($\psi_e$) has been calculated, these can be converted 508 back to estimated leading wheel angle ($\alpha_e$) and estimated trailing wheel angle ($\beta_e$) by taking the inverse of Equation 1;

$$\alpha_e = \psi_e + \phi_e \text{ and } \beta_e = \psi_e - \phi_e \qquad \text{(Eq. 36)}$$

Finally, an operation of the vehicle can be controlled 510 by using the newly estimated angles ($\alpha_e$, $\beta_e$) can be used instead of the steering rack measurements ($\alpha_c$, $\beta_c$). The estimated angles may then be used to e.g., estimating safe trajectories. For example, the estimated angles may be directly used by downstream processes to determine vehicle position, which may be used for localization or other map related operations (e.g., pose estimation). In some examples, one or more of the estimated wheel angles may be used to estimate a vehicle velocity.

Additional Example Vehicle System

Figure 6:
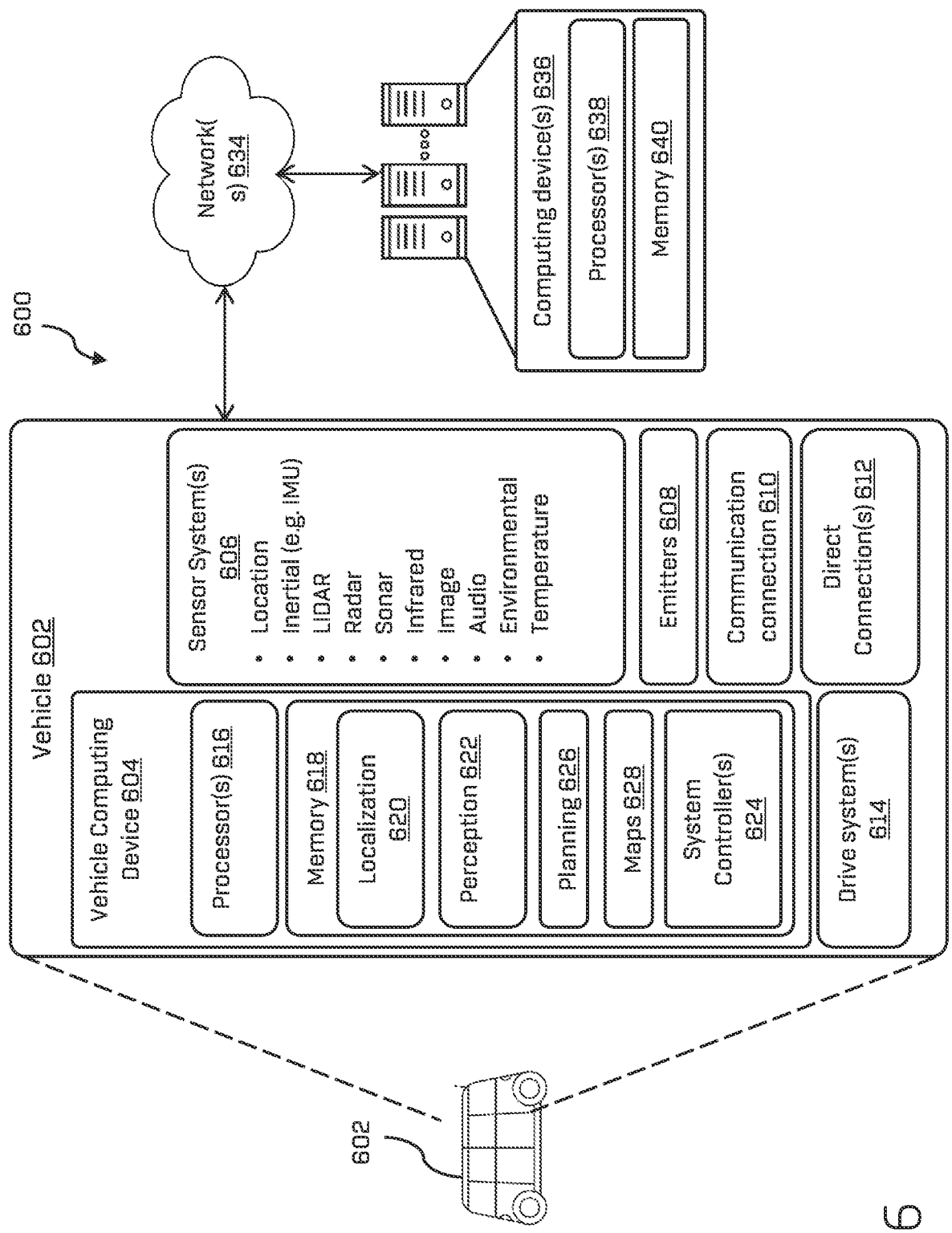
FIG. 6 depicts a block diagram of an example vehicle system.

A further example of a vehicle system 600 is depicted in FIG. 6. The vehicle system 600 includes a vehicle 602, which may be the vehicles 102 in FIGS. 1*a-b* as well as any of the vehicles in FIGS. 2*a-c* and FIG. 3. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification. Moreover, in some instances, the techniques described herein may be usable in conjunction with non-autonomous vehicles as well.

The vehicle 602 may include vehicle computing device(s) 604, one or more sensor systems 606, one or more communication connections 610, at least one direct connection 612 (e.g., for physically coupling the vehicle 602 to exchange data and/or to provide power), and one or more drive systems 614.

In some instances, the sensor(s) 606 (referred to as 124*a*-124*d*, 125, 126*a-d*, 132 in FIGS. 1*a-b*) may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 606 may include multiple instances of each of these or other types of sensors. For instance, the LIDAR sensors may include individual LIDAR sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 such as relating to a yaw rate of a vehicle, a linear velocity of the vehicle, a lateral velocity of the vehicle, and commanded wheel angles of the wheels such that the vehicle computing device(s) 604 (or a remote computing device 636) may determine the scaling and bias coefficients as discloses herein.

The vehicle computing device(s) 604 may include one or more processors 616 and memory 618 communicatively coupled with the one or more processors 616. In the illustrated example, the memory 618 of the vehicle computing device(s) 604 stores a localization component 620, a perception component 622, a planning component 626, one or more maps 628, one or more system controllers 624, and a safety system 630. Though depicted in FIG. 6 as residing in memory 620 for illustrative purposes, it is contemplated that the localization component 620, perception component 622, planning component 626, safety system 630 and/or the one or more maps 628 may be accessible to the vehicle 602 (e.g., stored on, or otherwise accessible by, memory remote from the vehicle 602). The memory 620 may further store data set(s) comprising the estimated lateral acceleration, the estimated turn angle, the commanded crab angle and the lateral velocity, wherein data set(s) is/are used to perform the optimization to determine the scaling and bias coefficients as discussed herein. Such data set, or part of said data set, may also be accessible to the vehicle 602 (e.g., stored on, or otherwise accessible by, memory remote from the vehicle 602).

An example of this remote memory is the computing device 636. The computing device 636 may include one or more processors 638 and memory 640. Although not depicted here, in some instances the computing device 636 may store the above-referenced components and controllers. The processor 616 may access these as required from the computing device 636 via the network 614 that connects the vehicle 602 and the computing device 636.

In some examples, the vehicle 602 may send operational data, including raw or processed sensor data from the sensor system(s) 606, to one or more computing device(s) 616 via the network(s) 614.

In some instances, the perception component 622 may include functionality to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, traffic light, building, tree, road surface, curb, sidewalk, unknown, etc.). In additional or alternative examples, the perception component 622 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 602 may provide the data relating to the objects in the environment as inputs to a perception component of the vehicle computing device, such as perception component 622. The perception component may use the data to perform object detection, segmentation, classification, and other data processing to determine characteristics about the objects.

The perception component 622 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 626 or localization component such as localization component 620, or from a remote device, such as remote computing device 636. In some examples, the data may comprise map data received from the maps 628 or the other components in memory.

The data gathered may be communicated from a starting, first component, e.g., the processors of the vehicle, to a target, second component, such as a different device, different hardware, or different software. The term component is here used to refer to devices, hardware, software, or other features of a computing system to which data may be transferred, and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device, or may be in remote computing devices. For example, referring to FIG. 6, the data may be transferred from the perception component 622 to other software components stored in the memory 618 of the vehicle, such as the localization component 620 or planning component 626. In some instances, the data may be transferred from the perception component 622 to the remote computing device 636 via the communication connection 610 and network 634.

The localization component 620 may be configured to receive data from the sensor system(s) 606 to determine a position and/or orientation of the vehicle 602, e.g., one or more of an x-, y-, z-position, roll (such as used for determining a gravitational acceleration in Equation 30), pitch, or yaw. For example, the localization component 620 may include and/or request/receive a map 628 of an environment and may continuously determine a location and/or orientation of the autonomous vehicle within the map 628. For example, the localization component 620 may determine the lateral velocity of the vehicle 602 as described herein.

In at least one example, the planning component 626 may determine a location of a user based on image data of an environment received from the user using, for example, bags of binary words with image-based features, artificial neural network, and the like. Further, the planning component 626 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In at least one example, the planning component 626 may determine a pickup location based at least in part on determining a user identity (e.g., determined via image recognition or received as an indication from a user device, as discussed herein).

A communication connection 610 may enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 608 may additionally or alternatively allow the vehicle 602 to communicate with other nearby computing device(s) (e.g., other nearby vehicles, traffic signals, etc.). The communication connection(s) 610 may additionally or alternatively enable the vehicle 602 to communicate with a computing device 636. The computing device 636 may be at a remote location from the vehicle and the vehicle may communication with the computing device 636 over a network 614.

It will be appreciated that data usable for determining (and using) scaling and bias coefficients for a linear model to estimate a crab angle is used as examples in FIGS. 1-5, but that any data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 602, map data may be transferred from the one or more maps 628 of the vehicle memory 618 to the localization or planning components 620, 626. In some examples, data may be transferred from the planning component 626 to the system controller 624 and/or one or more emitters 608. In some examples, data may be transferred from the system controller 624 to one or more drive systems 614.

The maps 628 may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 228 may be stored based on, for example, a characteristic (e.g., type of entity, time of day, day of week, season of the year, etc.). Storing multiple maps 628 may have similar memory requirements, but increase the speed at which data in a map may be accessed. As discussed herein, the maps 628 may further indicate the known locations of traffic lights and may be used by the perception 622 to identify known traffic lights in measurements captured by the sensor system(s) 606.

The system controller 624 may be configured to control steering, propulsion, braking, safety, emitters, communication, and other systems of the vehicle 602. The system controller(s) 624 may communicate with and/or control corresponding systems of the drive system(s) 614 and/or other components of the vehicle 602. The system controller(s) 624 may be communicatively coupled to one or more sensors of the vehicle sensor system(s) 606.

Emitter(s) 608 may be provided for emitting light and/or sound, and may include interior emitters to communicate with passengers of the vehicle 602 and/or exterior emitter(s) to communicate with pedestrians or other nearby vehicles.

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 620, 640 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

EXAMPLE CLAUSES

A: A system comprising: one or more processors; and one or more non-transitory computer-readable media storing instructions executable by the one or more processors, wherein the instructions, when executed, cause the system to perform operations comprising: receiving sensor data from a sensor associated with a vehicle; determining, based at least in part on the sensor data, a yaw rate of a vehicle, a linear velocity of the vehicle, a lateral velocity of the vehicle; receiving a commanded wheel angle indicative of a desired wheel angle of a pair of wheels; determining, based at least in part on the commanded wheel angle, a turn angle indicative of a degree of rotation of the vehicle and a crab angle indicative of an angle of motion of the vehicle; determining, based at least in part of the yaw rate and the linear velocity, an estimated lateral acceleration of the vehicle; determining based at least in part on the yaw rate, the linear velocity and a distance between a rear axle and a front axle of the vehicle, an estimated turn angle of the vehicle; determining a linear model to determine an estimated crab angle, the linear model based at least in part on the estimated lateral acceleration, the estimated turn angle and the crab angle and comprising scaling and bias coefficients; determining the scaling and bias coefficients by performing an optimization; and controlling an operation of the vehicle based at least in part on the scaling and bias coefficients.

B: The system of clause A wherein the commanded wheel angle is indicative of a desired wheel angle of a leading pair of wheels, wherein the instructions further cause the system to perform actions comprising: determining a wheel angle of a trailing pair of wheels of the vehicle, wherein the wheel angle of the trailing pair of wheels of the vehicle equals the commanded wheel angle with a reversed sign; and determining, based at least in part on the commanded wheel angle and the wheel angle of the trailing pair of wheels of the vehicle, the turn angle and the crab angle.

C: The system of any one of clauses A-B, wherein the commanded wheel angle is a first commanded wheel angle indicative of a desired wheel angle of a leading pair of wheels, wherein the instructions further cause the system to perform actions comprising: receiving a second commanded wheel angle indicative of a desired wheel angle of a trailing pair of wheels; determining, based at least in part on the first and second commanded wheel angles, the turn angle and the crab angle, and determining based at least in part on the yaw rate, the linear velocity of the leading pair of wheels, the linear velocity of the trailing pair of wheels, and a distance between a rear axle and a front axle of the vehicle, an estimated turn angle of the vehicle.

D: The system of any one of clauses A-C, wherein the instructions further cause the system to perform actions comprising determining a relative position of the vehicle compared to a previous known position of the vehicle, wherein the relative position of the vehicle is determined at least in part by estimating a wheel angle of a pair of wheels based at least in part on scaling and bias coefficients.

E: The system of any one of clauses A-D, wherein the instructions further cause the system to perform actions comprising; determining a difference between one of the scaling and bias coefficients, and a corresponding historical scaling or bias coefficient; detecting, based at least in part on that the difference meets or exceeds a threshold value, an event; and controlling the operation of the vehicle based at least in part of the event.

F: The system of any one of clauses A-E, wherein the sensor data is received from a log file comprising historical data associated with the sensor.

G: A method comprising: receiving a commanded steering angle for steering a vehicle; determining, based at least in part of the commanded steering angle, a crab angle indicative of an angle of motion of the vehicle; determining, based at least in part on sensor data received from a sensor associated with the vehicle, an estimated turn angle indicative of an estimation of a degree of rotation of the vehicle and an estimated lateral acceleration of the vehicle; determining, based at least in part on the estimated lateral acceleration, the estimated turn angle, the crab angle and a lateral velocity of the vehicle, one or more of a scaling or bias coefficient to be used in a linear model for estimating a crab angle of the vehicle; and controlling an operation of the vehicle based at least in part on the one or more of the scaling or bias coefficient.

H: The method of clause G, further comprising: determining the commanded steering angle based at least in part on at least one of: a steering rack travel; and a steering motor rotation.

I: The method of any of clauses G-H, wherein the commanded steering angle applies to a leading pair of wheels of the vehicle, where the method further comprising: determining a wheel angle of a trailing pair of wheels of the vehicle, wherein the wheel angle of the trailing pair of wheels of the vehicle equals the commanded steering angle with a reversed sign; and determining, based at least in part on the commanded steering angle and the wheel angle of the trailing pair of wheels of the vehicle, the crab angle.

J: The method of any one of clauses G-I, wherein the commanded steering angle applies to a leading pair of wheels of the vehicle, where the method further comprising: determining, based at least in part on the commanded steering angle and a second commanded steering angle, the commanded crab angle, wherein the second commanded steering angle being indicative of a wheel angle of a trailing pair of wheels of the vehicle.

K: The method of any one of clauses G-J, wherein the linear model defines the vehicle according to a bicycle model, wherein the bicycle model being a mathematical model in which a leading pair of wheels of the vehicle is combined into one leading wheel, and in which a trailing pair of wheels of the vehicle is combined into one trailing wheel.

L: The method according to any one of clauses G-K, further comprising: determining a difference between one of the scaling and bias coefficients and a corresponding historical scaling or bias coefficient; detecting, based at least in part on that the difference meets or exceeds a threshold value, an event; and controlling the operation of the vehicle based at least in part of the event.

M: The method according to any one of clauses G-L, wherein the estimated lateral acceleration comprises a centripetal acceleration component and a gravitational acceleration component.

N: The method according to any one of clauses G-M, further comprising: determining, based at least in part on the scaling and bias coefficients, an estimated wheel angle of a wheel of the vehicle, and updating a position of the vehicle on a map based at least in part on the estimated wheel angle.

O: The method according to any one of clauses G-N, further comprising: determining, based at least in part on the sensor data from a sensor associated with a vehicle, a yaw rate of a vehicle, a linear velocity of the vehicle, a lateral velocity of the vehicle; and determining based at least in part on the yaw rate, the linear velocity and a distance between a rear axle and a front axle of the vehicle, an estimated turn angle of the vehicle.

P: One or more non-transitory computer-readable media storing instructions executable by one or more processors, wherein the instructions, when executed, cause the one or more processors to perform operations comprising: receiving a commanded steering angle for steering a vehicle; determining, based at least in part of the commanded steering angle, a crab angle indicative of an angle of motion of the vehicle; determining, based at least in part on sensor data received from a sensor associated with the vehicle, an estimated turn angle indicative of an estimation of a degree of rotation of the vehicle and an estimated lateral acceleration of the vehicle; determining, based at least in part on the estimated lateral acceleration, the estimated turn angle, the crab angle and a lateral velocity of the vehicle, one or more of a scaling or bias coefficient to be used in a linear model for estimating a crab angle of the vehicle; and controlling an operation of the vehicle based at least in part on the one or more of the scaling or bias coefficient.

Q: The one or more non-transitory computer-readable media of clause P, wherein the operations further comprise: determining the commanded steering angle based at least in part on at least one of: a steering rack travel; and a steering motor rotation.

R: The one or more non-transitory computer-readable media of any one of clauses P-Q, wherein the commanded steering angle applies to a leading pair of wheels of the vehicle wherein the operations further comprise; determining a wheel angle of a trailing pair of wheels of the vehicle, wherein the wheel angle of the trailing pair of wheels of the vehicle equals the commanded steering angle with a reversed sign; and determining, based at least in part on the commanded steering angle and the wheel angle of the trailing pair of wheels of the vehicle, the crab angle.

S: The one or more non-transitory computer-readable media of any one of clauses P-R, wherein the commanded steering angle applies to a leading pair of wheels of the vehicle, wherein the operations further comprise: determining, based at least in part on the commanded steering angle and a second commanded steering angle, the commanded crab angle, wherein the second commanded steering angle being indicative of a wheel angle of a trailing pair of wheels of the vehicle.

T: The one or more non-transitory computer-readable media of any one of clauses P-S, wherein the linear model defines the vehicle according to a bicycle model, wherein the bicycle model being a mathematical model in which a leading pair of wheels of the vehicle is combined into one leading wheel, and in which a trailing pair of wheels of the vehicle is combined into one trailing wheel.

U: The one or more non-transitory computer-readable media of any one of clauses P-T, wherein the operations further comprise: determining a difference between one of the scaling and bias coefficients and a corresponding historical scaling or bias coefficient; detecting, based at least in part on that the difference meets or exceeds a threshold value, an event; and controlling the operation of the vehicle based at least in part of the event.

V: The one or more non-transitory computer-readable media of any one of clauses P-U, wherein the estimated lateral acceleration comprises a centripetal acceleration component and a gravitational acceleration component.

X: The one or more non-transitory computer-readable media of any one of clauses P-V, wherein the operations further comprise: determining, based at least in part on the scaling and bias coefficients, an estimated wheel angle of a wheel of the vehicle, and updating a position of the vehicle on a map based at least in part on the estimated wheel angle.

Y: The one or more non-transitory computer-readable media of any one of clauses P-X, wherein the operations further comprise: determining, based at least in part on the sensor data from a sensor associated with a vehicle, a yaw rate of a vehicle, a linear velocity of the vehicle, a lateral velocity of the vehicle; and determining based at least in part on the yaw rate, the linear velocity and a distance between a rear axle and a front axle of the vehicle, an estimated turn angle of the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-Y may be implemented alone or in combination with any other one or more of the examples A-Y

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing instructions executable by the one or more processors, wherein the instructions, when executed, cause the system to perform operations comprising:
receiving sensor data from a sensor associated with a vehicle;
determining, based at least in part on the sensor data, a yaw rate of the vehicle and a linear velocity of the vehicle;
receiving a commanded wheel angle indicative of a desired wheel angle of a pair of wheels;
determining, based at least in part on the commanded wheel angle, a commanded turn angle indicative of a degree of rotation of the vehicle about a turning point and a commanded crab angle indicative of an angle of motion of the vehicle relative to a center of the vehicle;
determining, based at least in part on the yaw rate and the linear velocity, an estimated lateral acceleration of the vehicle;
determining based at least in part on the yaw rate, the linear velocity and a distance between a rear axle and a front axle of the vehicle, an estimated turn angle of the vehicle;
determining a linear model to determine an estimated crab angle, the linear model based at least in part on the estimated lateral acceleration, the estimated turn angle and the commanded crab angle and comprising scaling and bias coefficients;
determining the scaling and bias coefficients by performing an optimization; and
controlling movement of the vehicle based at least in part on the scaling and bias coefficients.

2. The system of claim 1, wherein the commanded wheel angle is indicative of a desired wheel angle of a leading pair of wheels, wherein the instructions further cause the system to perform actions comprising:
determining a wheel angle of a trailing pair of wheels of the vehicle, wherein the wheel angle of the trailing pair of wheels of the vehicle equals the commanded wheel angle with a reversed sign; and
determining, based at least in part on the commanded wheel angle and the wheel angle of the trailing pair of wheels of the vehicle, the commanded turn angle and the commanded crab angle.

3. The system of claim 1, wherein the commanded wheel angle is a first commanded wheel angle indicative of a desired wheel angle of a leading pair of wheels, wherein the instructions further cause the system to perform actions comprising:
receiving a second commanded wheel angle indicative of a desired wheel angle of a trailing pair of wheels;
determining, based at least in part on the first and second commanded wheel angles, the commanded turn angle and the commanded crab angle, and
determining based at least in part on the yaw rate, the linear velocity of the leading pair of wheels, the linear velocity of the trailing pair of wheels, and a distance between a rear axle and a front axle of the vehicle, an estimated turn angle of the vehicle.

4. The system of claim 1, wherein the instructions further cause the system to perform actions comprising determining a relative position of the vehicle compared to a previous known position of the vehicle, wherein the relative position of the vehicle is determined at least in part by estimating a wheel angle of a pair of wheels based at least in part on scaling and bias coefficients.

5. The system of claim 1, wherein the instructions further cause the system to perform actions comprising;
determining a difference between one of the scaling and bias coefficients, and a corresponding historical scaling or bias coefficient;
detecting, based at least in part on that the difference meets or exceeds a threshold value, an event; and
controlling the vehicle based at least in part of the event.

6. A method comprising:
receiving a commanded steering angle for steering a vehicle;
determining, based at least in part of the commanded steering angle, a crab angle indicative of an angle of motion of the vehicle;
determining, based at least in part on sensor data received from a sensor associated with the vehicle, an estimated turn angle indicative of an estimation of a degree of rotation of the vehicle and an estimated lateral acceleration of the vehicle;
determining, based at least in part on the estimated lateral acceleration, the estimated turn angle, the crab angle and a lateral velocity of the vehicle, one or more of a scaling or bias coefficient to be used in a linear model for estimating an estimated crab angle of the vehicle; and
controlling movement of the vehicle based at least in part on the one or more of the scaling or bias coefficient.

7. The method according to claim 6, further comprising:
determining the commanded steering angle based at least in part on at least one of:
a steering rack travel; and
a steering motor rotation.

8. The method of claim 6, wherein the commanded steering angle applies to a leading pair of wheels of the vehicle, where the method further comprising:
determining a wheel angle of a trailing pair of wheels of the vehicle, wherein the wheel angle of the trailing pair of wheels of the vehicle equals the commanded steering angle with a reversed sign; and
determining, based at least in part on the commanded steering angle and the wheel angle of the trailing pair of wheels of the vehicle, the crab angle.

9. The method of claim 6, wherein the commanded steering angle applies to a leading pair of wheels of the vehicle, where the method further comprising:
determining, based at least in part on the commanded steering angle and a second commanded steering angle, the crab angle, wherein the second commanded steering angle being indicative of a wheel angle of a trailing pair of wheels of the vehicle.

10. The method of claim 6, wherein the linear model defines the vehicle according to a bicycle model, wherein the bicycle model being a mathematical model in which a leading pair of wheels of the vehicle is combined into one leading wheel, and in which a trailing pair of wheels of the vehicle is combined into one trailing wheel.

11. The method according to claim 6, further comprising:
determining a difference between one of the scaling and bias coefficients and a corresponding historical scaling or bias coefficient;

detecting, based at least in part on that the difference meets or exceeds a threshold value, an event; and controlling the vehicle based at least in part of the event.

12. The method according to claim 6, wherein the estimated lateral acceleration comprises a centripetal acceleration component and a gravitational acceleration component.

13. The method according to claim 6, further comprising:

determining, based at least in part on the scaling and bias coefficients, an estimated wheel angle of a wheel of the vehicle, and updating a position of the vehicle on a map based at least in part on the estimated wheel angle.

14. The method according to claim 6, further comprising:

determining, based at least in part on the sensor data from a sensor associated with a vehicle, a yaw rate of a vehicle, a linear velocity of the vehicle, a lateral velocity of the vehicle; and determining based at least in part on the yaw rate, the linear velocity and a distance between a rear axle and a front axle of the vehicle, an estimated turn angle of the vehicle.

15. One or more non-transitory computer-readable media storing instructions executable by one or more processors, wherein the instructions, when executed, cause the one or more processors to perform operations comprising:

receiving a commanded steering angle for steering a vehicle;

determining, based at least in part of the commanded steering angle, a crab angle indicative of an angle of motion of the vehicle;

determining, based at least in part on sensor data received from a sensor associated with the vehicle, an estimated turn angle indicative of an estimation of a degree of rotation of the vehicle and an estimated lateral acceleration of the vehicle;

determining, based at least in part on the estimated lateral acceleration, the estimated turn angle, the crab angle and a lateral velocity of the vehicle, one or more of a scaling or bias coefficient to be used in a linear model for estimating an estimated crab angle of the vehicle; and controlling movement of the vehicle based at least in part on the one or more of the scaling or bias coefficient.

16. The one or more non-transitory computer-readable media of claim 15, wherein the operations further comprise:

determining the commanded steering angle based at least in part on at least one of:

a steering rack travel; and a steering motor rotation.

17. The one or more non-transitory computer-readable media of claim 15, wherein the commanded steering angle applies to a leading pair of wheels of the vehicle, wherein the operations further comprise:

determining a wheel angle of a trailing pair of wheels of the vehicle, wherein the wheel angle of the trailing pair of wheels of the vehicle equals the commanded steering angle with a reversed sign; and determining, based at least in part on the commanded steering angle and the wheel angle of the trailing pair of wheels of the vehicle, the crab angle.

18. The one or more non-transitory computer-readable media of claim 15, wherein the commanded steering angle applies to a leading pair of wheels of the vehicle, wherein the operations further comprise:

determining, based at least in part on the commanded steering angle and a second commanded steering angle, the crab angle, wherein the second commanded steering angle being indicative of a wheel angle of a trailing pair of wheels of the vehicle.

19. The one or more non-transitory computer-readable media of claim 15, wherein the linear model defines the vehicle according to a bicycle model, wherein the bicycle model being a mathematical model in which a leading pair of wheels of the vehicle is combined into one leading wheel, and in which a trailing pair of wheels of the vehicle is combined into one trailing wheel.

20. The one or more non-transitory computer-readable media of claim 15, wherein the operations further comprise:

determining a difference between one of the scaling and bias coefficients, and a corresponding historical scaling or bias coefficient;

detecting, based at least in part on that the difference meets or exceeds a threshold value, an event; and controlling the vehicle based at least in part of the event.

* * * * *